(12) United States Patent
Huang et al.

(10) Patent No.: US 12,036,770 B2
(45) Date of Patent: Jul. 16, 2024

(54) POLYMER FILM AND USES OF THE SAME

(71) Applicant: Chang Chun Petrochemical Co., Ltd., Taipei (TW)

(72) Inventors: Yen-Chen Huang, Taipei (TW); Tzu-Jung Huang, Taipei (TW)

(73) Assignee: Chang Chun Petrochemical Co., Ltd., Taipei (TW)

( * ) Notice: Subject to any disclaimer, the term of this patent is extended or adjusted under 35 U.S.C. 154(b) by 0 days.

(21) Appl. No.: 17/706,293

(22) Filed: Mar. 28, 2022

(65) Prior Publication Data

US 2023/0117573 A1    Apr. 20, 2023

(30) Foreign Application Priority Data

Oct. 18, 2021   (CN) .......................... 202111207963.5
Oct. 18, 2021   (TW) ................................ 110138590

(51) Int. Cl.
  *B32B 17/10*   (2006.01)
  *B32B 27/08*   (2006.01)
  *B32B 27/30*   (2006.01)

(52) U.S. Cl.
  CPC .. *B32B 17/10761* (2013.01); *B32B 17/10036* (2013.01); *B32B 17/10605* (2013.01); *B32B 27/08* (2013.01); *B32B 27/306* (2013.01); *B32B 2307/732* (2013.01)

(58) Field of Classification Search
  CPC ........ B32B 17/10761; B32B 17/10036; B32B 17/10605; B32B 17/1055; B32B 17/10568; B32B 17/10577; B32B 17/10587; B32B 27/08; B32B 27/306; B32B 2307/732; B32B 38/06; Y10T 428/24479; Y10T 428/24612; Y10T 428/24942; Y10T 428/2495; Y10T 428/24959
  USPC .......................... 428/156, 172, 212, 213, 214
  See application file for complete search history.

(56) References Cited

U.S. PATENT DOCUMENTS

| | | | |
|---|---|---|---|
| 6,863,956 B1 * | 3/2005 | Nakajima | B29C 59/022 428/167 |
| 11,136,441 B2 | 10/2021 | Huang et al. | |
| 2016/0289362 A1 * | 10/2016 | Wade | B32B 27/42 |
| 2017/0072665 A1 | 3/2017 | Iwamoto et al. | |
| 2017/0259533 A1 * | 9/2017 | Yamamoto | B32B 17/10036 |
| 2019/0156811 A1 | 5/2019 | Wang et al. | |
| 2020/0023621 A1 | 1/2020 | Yoshida et al. | |
| 2021/0162717 A1 | 6/2021 | Chang et al. | |
| 2021/0163697 A1 * | 6/2021 | Huang | C08J 3/18 |
| 2021/0305580 A1 | 9/2021 | Huang et al. | |

FOREIGN PATENT DOCUMENTS

| | | | |
|---|---|---|---|
| CN | 105399979 A | | 9/2016 |
| CN | 107619202 A | | 1/2018 |
| CN | 110536797 A | | 12/2019 |
| CN | 112876705 A | | 6/2021 |
| EP | 3 827 979 A1 | | 6/2021 |
| EP | 3 827 980 A1 | | 6/2021 |
| JP | H1135347 A | * | 2/1999 |
| JP | 2021-154735 A | | 10/2021 |
| KR | 10-2005673 B1 | | 7/2019 |
| KR | 10-2021-0017714 A | | 2/2021 |
| KR | 10-2021-0068299 A | | 6/2021 |
| KR | 10-2021-0094795 A | | 7/2021 |
| TW | 202120604 A | | 6/2021 |
| WO | WO 2018/182032 A1 | | 10/2018 |

OTHER PUBLICATIONS

Vvv (Dale Void Volume). Available from Keyence.com on Nov. 10, 2016. (Year: 2016).*

* cited by examiner

*Primary Examiner* — Megha M Gaitonde

(74) *Attorney, Agent, or Firm* — Christensen, Fonder, Dardi & Herbert PLLC

(57) ABSTRACT

A polymer film and laminated glass manufactured using the polymer film. The polymer film includes a first and second layer, and a third layer disposed between the first and second layers, and the two surfaces of the third layer are in contact with the first and second layers, respectively. The surface of the first layer that is not in contact with the third layer is a first surface, and the surface of the second layer not in contact with the third layer is a second surface, wherein the first surface has a void volume (Vv) value at a material ratio of 10% ranging from 3 $\mu m^3/\mu m^2$ to 30 $\mu m^3/\mu m^2$ and a dale void volume (Vvv) at a material ratio of 80% less than 2 $\mu m^3/\mu m^2$, and the ratio of the maximum pit height (Sv) of the first surface to the thickness of the first layer is 0.2 or less.

14 Claims, No Drawings

POLYMER FILM AND USES OF THE SAME

CLAIM FOR PRIORITY

This application claims the benefit of Taiwan Patent Application No. 110138590 filed on Oct. 18, 2021 and the benefit of China Patent Application No. 202111207963.5 filed on Oct. 18, 2021, the subject matters of which are incorporated herein in their entirety by reference.

BACKGROUND OF THE INVENTION

Field of the Invention

The present invention relates to a polymer film, specifically to a polymer film with a void volume (Vv) and dale void volume (Vvv) at a specific material ratio and a specific ratio of a maximum pit height (Sv) to the thickness of a first layer. The present invention also relates to a laminated glass manufactured by using the polymer film.

Descriptions of the Related Art

Laminated glass is a glass material with a composite structure formed by interposing a polymer film between two glass sheets and performing hot-pressing to bond the glass sheets and the polymer film tightly together. Since laminated glass has superior impact resistance and acoustic insulation property, they are widely used in the automobile and building industries.

Since the manufacturing process of laminated glass involves the hot-pressing of glass sheets and a polymer film, to avoid leaving air between the glass sheets and polymer film of the laminated glass, the surfaces of the polymer film are usually embossed in advance to form textures (i.e., a designed concavo-convex structure) to facilitate de-airing during pre-pressing, thereby avoiding generating bubbles in the laminated glass.

The polymer film of the laminated glass can have a multilayer structure to impart desired functions to the laminated glass. For example, laminated glass with an acoustic insulation function can be manufactured by using a polymer film having two outer layers and one sound shielding inner layer.

When a polymer film with a multilayer film structure is subject to machine embossing, the textures that should only be formed on the surface of the outer layer are usually transfer-printed to the surface of the inner functional layer (i.e., a sound shielding layer) of the polymer film. The textures on the surface of the functional layer cannot be eliminated through the subsequent hot-pressing process of the laminated glass and will result in fine lines visible to the human eye. The fine lines in the laminated glass will cause visual defects of optical distortion and thus affect the visibility of the laminated glass.

SUMMARY OF THE INVENTION

The present invention is directed to a polymer film, which has a structure including at least three layers, wherein the polymer film has a void volume (Vv) and dale void volume (Vvv) at a specific material ratio and a specific ratio of a maximum pit height (Sv) to the thickness of a first layer. The laminated glass manufactured by hot-pressing the polymer film of the present invention and glass sheets does not have the defects of air bubbles and edge-delamination or the optical distortion problem. Thus, the polymer film of the present invention is particularly suitable for the manufacture of functional acoustic insulating laminated glass.

An objective of the present invention is to provide a polymer film, which comprises a first layer, a second layer, and a third layer disposed between the first layer and the second layer, wherein the two surfaces of the third layer are in contact with the first layer and the second layer, respectively, the surface of the first layer that is not in contact with the third layer is a first surface, and the surface of the second layer that is not in contact with the third layer is a second surface, wherein the first surface has a void volume (Vv) value at a material ratio of 10% ranging from 3 $\mu m^3/\mu m^2$ to 30 $\mu m^3/\mu m^2$ and a dale void volume (Vvv) at a material ratio of 80% less than 2 $\mu m^3/\mu m^2$, and the ratio of the maximum pit height (Sv) of the first surface to the thickness of the first layer is 0.2 or less.

In some embodiments of the present invention, the second surface has a void volume (Vv) value at a material ratio of 10% ranging from 3 $\mu m^3/\mu m^2$ to 30 $\mu m^3/\mu m^2$ and a dale void volume (Vvv) at a material ratio of 80% less than 2 $\mu m^3/\mu m^2$, and the ratio of the maximum pit height (Sv) of the first surface to the thickness of the second layer is 0.2 or less.

In some embodiments of the present invention, the first layer and the second layer independently have a thickness ranging from 250 μm to 450 μm.

In some embodiments of the present invention, the thickness of the first layer is identical to the thickness of the second layer.

In some embodiments of the present invention, the third layer has a thickness ranging from 50 μm to 250 μm.

In some embodiments of the present invention, the polymer film comprises polyvinyl acetal, and the polyvinyl acetal can be selected from the group consisting of poly (vinyl formal), poly(vinyl acetal), poly(vinyl butyral), poly (vinyl pentanal), poly(vinyl hexanal), and combinations thereof. In the preferred embodiments of the present invention, the polyvinyl acetal is poly(vinyl butyral).

In some embodiments of the present invention, the third layer comprises polyvinyl acetal and has a glass transition temperature (Tg) ranging from −30° C. to 10° C., and wherein the polyvinyl acetal has a degree of acetalization ranging from 52 mol % to 80 mol %, a degree of acetylation ranging from 0.1 mol % to 20 mol %, and content of hydroxyl ranging from 20 mol % to 28 mol %.

In some embodiments of the present invention, the polymer film has a thickness ranging from 0.1 mm to 2.5 mm.

Another objective of the present invention is to provide laminated glass, which comprises a first glass sheet, a second glass sheet, and an intermediate film disposed between the first glass sheet and the second glass sheet, wherein the intermediate film is provided by the aforementioned polymer film.

To render the above objectives, technical features, and advantages of the present invention more apparent, the present invention will be described in detail regarding some embodiments hereinafter.

BRIEF DESCRIPTION OF THE DRAWINGS

Not applicable.

DESCRIPTION OF THE PREFERRED EMBODIMENTS

Hereinafter, some embodiments of the present invention will be described in detail. However, the present invention may be embodied in various embodiments and should not be limited to the embodiments described in the specification.

Unless it is additionally explained, the expressions "a," "the," or the like recited in the specification and the claims should include both the singular and the plural forms.

Unless it is additionally explained, the expressions "first," "second," or the like recited in the specification and the claims are merely used to distinguish the illustrated elements or constituents without special meanings. Those expressions are not used to represent any priority.

Unless it is additionally explained, the term "material ratio" as recited in the specification and the claims is defined in accordance with ISO 25178-2:2012. A material ratio curve means a function curve graph representing the surface height to a regional area enclosed thereby, and a material ratio means an enclosed regional area above a designated height.

Unless it is additionally explained, the term "void volume (Vv)" as recited in the specification and the claims is defined in accordance with ISO 25178-2:2012. A void volume means the volume of voids per unit area at a specific material ratio.

Unless it is additionally explained, the term "dale void volume (Vvv)" as recited in the specification and the claims is defined in accordance with ISO 25178-2:2012. A dale void volume means the volume of dale space at a specific material ratio.

Unless it is additionally explained, the term "maximum pit height (Sv)" as recited in the specification and the claims is defined in accordance with ISO 25178-2:2012. A maximum pit height means the absolute value of the height of the largest pit within the defined area.

Unless it is additionally explained, the term "core void volume (Vvc)" as recited in the specification and the claims is defined in accordance with ISO 25178-2:2012. A core void volume means the volume of core space at a specific material ratio.

The present invention provides a polymer film with at least three layers, which has a void volume (Vv) and dale void volume (Vvv) at a specific material ratio and a specific ratio of a maximum pit height (Sv) to the thickness of a first layer. The polymer film of the present invention is useful in providing laminated glass having no bubbles and edge-delamination defects and having no optical distortion. The laminated glass manufactured by using the polymer film of the present invention is particularly suitable for serving as an acoustic insulating laminated glass. The polymer film of the present invention and the applications thereof are described in detail below.

1. POLYMER FILM

1.1. Constitution of Polymer Film

The polymer film of the present invention comprises a first layer, a second layer, and a third layer; alternatively, the polymer film of the present invention consists essentially of or consists of a first layer, a second layer, and a third layer. The third layer is disposed between the first layer and the second layer, and the two surfaces of the third layer are in contact with the first layer and the second layer, respectively. The first layer, the second layer, and the third layer independently comprise polyvinyl acetal as an essential constituent, and the first layer, the second layer, and the third layer may independently further comprise other optional constituents, such as a plasticizer or other conventional additives. In some embodiments of the present invention, the first layer, the second layer, and the third layer independently comprise polyvinyl acetal and a plasticizer; alternatively, the first layer, the second layer, and the third layer independently consist essentially of or consist of polyvinyl acetal and a plasticizer.

The first layer, the second layer, and the third layer independently have a single-layer structure or a structure with two or more layers. For example, the third layer can be a functional layer consisting of one or more thin films and providing one or more of the following functions: acoustic insulation function, thermal insulation function, reflection function, anti-reflection function, refraction function, anti-refraction function, light-splitting function, and dimming function. In some embodiments of the present invention, the third layer is a sound shielding layer having a single-layer structure.

1.1.1. Polyvinyl Acetal

Examples of polyvinyl acetal include but are not limited to poly(vinyl formal), poly(vinyl acetal), poly(vinyl butyral), poly(vinyl pentanal), and poly(vinyl hexanal). The above-mentioned polyvinyl acetal can either be used alone or in a mixture of two or more. In the preferred embodiments of the present invention, the polyvinyl acetal is poly(vinyl butyral). In the appended examples, the polymer film consists of poly(vinyl butyral) and a plasticizer.

The properties of polyvinyl acetal that can be used in the polymer film of the present invention are not limited but can be selected depending on the need to provide the desired textures on the surface of the polymer film. In some embodiments of the present invention, the polyvinyl acetal used in the first layer, the second layer, and the third layer of the polymer can have the following physical properties.

The polyvinyl acetal in the first layer and the second layer can independently have a weight average molecular weight (Mw) ranging from 230,000 to 280,000, and more specifically from 240,000 to 260,000, but the present invention is not limited thereto. The polyvinyl acetal in the third layer can have a weight average molecular weight (Mw) ranging from 280,000 to 450,000, and more specifically from 320,000 to 420,000, but the present invention is not limited thereto.

In some embodiments of the present invention, based on the total number of moles of hydroxyl, acetal group, and acetyl group of polyvinyl acetal, polyvinyl acetal comprised in the first layer and the second layer can independently have a content of acetal group (i.e., a degree of acetalization) ranging from 60 mol % to 85 mol %. For example, based on the total weight of hydroxyl, acetal group, and acetyl group of the polyvinyl acetal, the degree of acetalization of the polyvinyl acetal comprised in the first layer and the second layer can be independently 60 mol %, 60.5 mol %, 61 mol %, 61.5 mol %, 62 mol %, 62.5 mol %, 63 mol %, 63.5 mol %, 64 mol %, 64.5 mol %, 65 mol %, 65.5 mol %, 66 mol %, 66.5 mol %, 67 mol %, 67.5 mol %, 68 mol %, 68.5 mol %, 69 mol %, 69.5 mol %, 70 mol %, 70.5 mol %, 71 mol %, 71.5 mol %, 72 mol %, 72.5 mol %, 73 mol %, 73.5 mol %, 74 mol %, 74.5 mol %, 75 mol %, 75.5 mol %, 76 mol %, 76.5 mol %, 77 mol %, 77.5 mol %, 78 mol %, 78.5 mol %, 79 mol %, 79.5 mol %, 80 mol %, 80.5 mol %, 81 mol %, 81.5 mol %, 82 mol %, 82.5 mol %, 83 mol %, 83.5 mol %, 84 mol %, 84.5 mol %, or 85 mol %, or within a range between any two of the values described herein. In the preferred embodiments of the present invention, the polyvinyl acetal comprised in the first layer and the second layer can independently have a degree of acetalization ranging from 66 mol % to 75 mol %.

In some embodiments of the present invention, based on the total number of moles of hydroxyl, acetal group, and acetyl group of the polyvinyl acetal, the polyvinyl acetal comprised in the third layer can have a degree of acetalization ranging from 52 mol % to 80 mol %. For example, based on the total weight of hydroxyl, acetal group, and acetyl group of the polyvinyl acetal, the degree of acetalization of the polyvinyl acetal comprised in the third layer can be 52 mol %, 53 mol %, 54 mol %, 55 mol %, 56 mol %, 57 mol %, 58 mol %, 59 mol %, 60 mol %, 61 mol %, 62 mol %, 63 mol %, 64 mol %, 65 mol %, 66 mol %, 67 mol %, 68 mol %, 69 mol %, 70 mol %, 71 mol %, 72 mol %, 73 mol %, 74 mol %, 75 mol %, 76 mol %, 77 mol %, 78 mol %, 79 mol %, or 80 mol %, or within a range between any two of the values described herein.

In some embodiments of the present invention, based on the total number of moles of hydroxyl, acetal group, and acetyl group of the polyvinyl acetal, the polyvinyl acetal comprised in the first layer and the second layer can independently have a content of acetyl group (i.e., a degree of acetylization) ranging from 0.1 mol % to 10 mol %. For example, based on the total weight of hydroxyl, acetal group, and acetyl group of the polyvinyl acetal, the degree of acetylization of the polyvinyl acetal comprised in the first layer and the second layer can be independently 0.1 mol %, 0.15 mol %, 0.2 mol %, 0.25 mol %, 0.3 mol %, 0.35 mol %, 0.4 mol %, 0.45 mol %, 0.5 mol %, 0.55 mol %, 0.6 mol %, 0.65 mol %, 0.7 mol %, 0.75 mol %, 0.8 mol %, 0.85 mol %, 0.9 mol %, 0.95 mol %, 1 mol %, 1.5 mol %, 2 mol %, 2.5 mol %, 3 mol %, 3.5 mol %, 4 mol %, 4.5 mol %, 5 mol %, 5.5 mol %, 6 mol %, 6.5 mol %, 7 mol %, 7.5 mol %, 8 mol %, 8.5 mol %, 9 mol %, 9.5 mol %, or 10 mol %, or within a range between any two of the values described herein. In the preferred embodiments of the present invention, the polyvinyl acetal comprised in the first layer and the second layer can independently have a degree of acetylization ranging from 0.1 mol % to 5 mol %. When the degree of acetylization of the polyvinyl acetal comprised in the first layer and the second layer is lower than the designated range, the polymer film is relatively hard, making it relatively difficult to form textures. When the degree of acetylization of polyvinyl acetal comprised in the first layer and the second layer is higher than the designated range, the polymer film is relatively soft, making the textures too deep.

In some embodiments of the present invention, based on the total number of moles of hydroxyl, acetal group, and acetyl group of the polyvinyl acetal, the polyvinyl acetal comprised in the third layer can have a degree of acetylization ranging from 0.1 mol % to 20 mol %. For example, based on the total number of moles of hydroxyl, acetal group, and acetyl group of the polyvinyl acetal, the degree of acetylization of the polyvinyl acetal comprised in the third layer can be 0.1 mol %, 0.2 mol %, 0.3 mol %, 0.4 mol %, 0.5 mol %, 0.6 mol %, 0.7 mol %, 0.8 mol %, 0.9 mol %, 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, or 20 mol %, or within a range between any two of the values described herein.

In some embodiments of the present invention, based on the total number of moles of hydroxyl, acetal group, and acetyl group of the polyvinyl acetal, the polyvinyl acetal comprised in the first layer and the second layer can independently have content of hydroxyl ranging from 20 mol % to 32 mol %. For example, based on the total number of moles of hydroxyl, acetal group, and acetyl group of the polyvinyl acetal, the content of hydroxyl of the polyvinyl acetal comprised in the first layer and the second layer can be independently 20 mol %, 20.5 mol %, 21 mol %, 21.5 mol %, 22 mol %, 22.5 mol %, 23 mol %, 23.5 mol %, 24 mol %, 24.5 mol %, 25 mol %, 25.5 mol %, 26 mol %, 26.5 mol %, 27 mol %, 27.5 mol %, 28 mol %, 28.5 mol %, 29 mol %, 29.5 mol %, 30 mol %, 30.5 mol %, 31 mol %, 31.5 mol %, or 32 mol %, or within a range between any two of the values described herein. In the preferred embodiments of the present invention, the polyvinyl acetal comprised in the first layer and the second layer can independently have content of hydroxyl ranging from 25 mol % to 29 mol %. When the content of hydroxyl of the polyvinyl acetal comprised in the first layer and the second layer is higher than the designated range, the polymer film is relatively hard, making it relatively difficult to form textures. When the content of hydroxyl of the polyvinyl acetal comprised in the first layer and the second layer is lower than the designated range, the polymer film is relatively soft, making the textures too deep.

In some embodiments of the present invention, based on the total number of moles of hydroxyl, acetal group, and acetyl group of the polyvinyl acetal, the polyvinyl acetal comprised in the third layer can have content of hydroxyl ranging from 20 mol % to 28 mol %. For example, based on the total number of moles of hydroxyl, acetal group, and acetyl group of the polyvinyl acetal, the content of hydroxyl of the polyvinyl acetal comprised in the third layer can be 20 mol %, 20.5 mol %, 21 mol %, 21.5 mol %, 22 mol %, 22.5 mol %, 23 mol %, 23.5 mol %, 24 mol %, 24.5 mol %, 25 mol %, 25.5 mol %, 26 mol %, 26.5 mol %, 27 mol %, 27.5 mol %, or 28 mol %, or within a range between any two of the values described herein.

1.1.2. Plasticizer

As used herein, a plasticizer, also called a plasticizing agent, is a chemical substance that can modify the plasticity of a thermoplastic resin. Examples of the plasticizer include but are not limited to esters of polybasic acids or polyhydric alcohols, such as triethylene glycol bis(2-ethylhexanoate), tetraethylene glycol bis(2-ethylhexanoate), triethylene glycol bis(2-ethylbutyrate), tetraethylene glycol bis(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, bis[2-(2-butoxyethoxy)ethyl] adipate, polymeric adipates, dipropylene glycol dibenzoate, tripropylene glycol dibenzoate, polypropylene glycol dibenzoate, isodecyl benzoate, 2-ethylhexyl benzoate, propylene glycol dibenzoate, diisononyl phthalate, dibutoxyethyl terephthalate, castor oil, methyl ricinoleate, soybean oils, epoxidized soybean oils, and combinations thereof.

The amount of the plasticizer is not particularly limited, as long as the plasticizer can provide the desired plasticizing effect. In general, based on 100 parts by weight of polyvinyl acetal, the amount of plasticizer in the first layer and the second layer of the polymer film can independently range from 30 parts by weight to 60 parts by weight. For example, based on 100 parts by weight of the polyvinyl acetal, the amount of the plasticizer in the first layer and the second layer of the polymer film can be independently 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, 50 parts by weight, 51 parts by weight, 52 parts by weight, 53 parts by weight, 54 parts by weight, 55 parts by weight, 56 parts by weight, 57 parts by weight, 58 parts by weight, 59 parts by weight, or 60 parts by weight, or within a range between any two of the values described herein. In the preferred embodiments of the present invention, based on 100 parts by weight of the polyvinyl acetal, the amount of the plasticizer used in the first layer and the second layer of the polymer film can independently range from 30 parts by weight to 50 parts by weight. Based on 100 parts by weight of the polyvinyl acetal, the amount of the plasticizer used in the third layer of the polymer film can range from 50 parts by weight to 80 parts by weight. For example, based on 100 parts by weight of the polyvinyl acetal, the amount of the plasticizer used in the third layer of the polymer film can be 50 parts by weight, 51 parts by weight, 52 parts by weight, 53 parts by weight, 54 parts by weight, 55 parts by weight, 56 parts by weight, 57 parts by weight, 58 parts by weight, 59 parts by weight, 60 parts by weight, 61 parts by weight, 62 parts by weight, 63 parts by weight, 64 parts by weight, 65 parts by weight, 66 parts by weight, 67 parts by weight, 68 parts by weight, 69 parts by weight, 70 parts by weight, 71 parts by weight, 72 parts by weight, 73 parts by weight, 74 parts by weight, 75 parts by weight, 76 parts by weight, 77 parts by weight, 78 parts by weight, 79 parts by weight, or 80 parts by weight, or within a range between any two of the values described herein.

1.1.3. Other Conventional Additives

The polymer film may further comprise other conventional additives that can adaptively improve the workability of the polymer film during its manufacture or impart specific functions to the polymer film. Examples of the conventional additives include but are not limited to dyes, pigments, stabilizers, antioxidants, flame retardants, infrared absorbers, infrared blocking agents, ultraviolet absorbers, ultraviolet stabilizers, lubricants, dispersing agents, surfactants, chelating agents, coupling agents, binders, and adhesion controlling agents. The above-mentioned additives can be used alone or in a mixture of two or more. For example, the first layer, the second layer, and the third layer of the polymer film can independently further comprise a dye or pigment to become a colored polymer film. The first layer, the second layer, and the third layer of the polymer film can also independently comprise an ultraviolet absorber or infrared absorber to have an anti-ultraviolet function or anti-infrared function.

1.2. Properties of Polymer Film 1.2.1. Properties Relevant to Void Volume (Vv)

A concavo-convex structure of the surface of the polymer film can be determined by a three-dimensional image of surface morphology. ISO 25178-2:2012 is a measurement standard for evaluating surface morphology, which discloses several parameters relevant to surface morphology, including void volume (Vv), dale void volume (Vvv), core void volume (Vvc), and maximum pit height (Sv). Vv is defined as the volume of voids per unit area at a specific material ratio and can be calculated from an areal material ratio curve graph. In the areal material ratio curve graph, the Y-axis denotes a surface height and the X-axis denotes a material ratio. When the material ratio of the X-axis is 0%, the surface height of the Y-axis is maximum, and when the material ratio of the X-axis is 100%, the surface height of the Y-axis is 0. As an example, the Vv value at a material ratio of 10% represents the volume of voids enclosed below the horizontal cutting plane set at the surface height of the Y-axis corresponding to the material ratio of 10% of the X-axis. Therefore, when the material ratio is 0%, the Vv value is maximum. When the material ratio is 100%, the Vv value is 0. Vvv means the volume of dale space at a specific material ratio and can be calculated from an areal material ratio curve graph. For example, the Vvv value at a material ratio of 80% represents the volume of dale space enclosed above the areal material ratio curve at the material ratio of 80% to 100% of the X-axis. Vvc means the volume of core space at a specific material ratio and can be calculated from an areal material ratio curve graph. For example, the Vvc value at a material ratio of 10% to 80% represents the volume of core space enclosed above the areal material ratio curve at the material ratio of 10% to 80% of the X-axis. The sum of the Vvv value and the Vvc value is the Vv value. Sv means the absolute value of the height of the largest pit within the defined area, that is, the depth value of the deepest valley. The relevant descriptions for the Vv, Vvv, Vvc, Sv parameters can refer to ISO 25178-2: 2012, and the subject matters of which are incorporated herein in their entirety by reference.

During the manufacturing process of laminated glass, to ensure the air is smoothly removed rather than remains between the polymer film and glass sheets, the surface of the polymer film is usually formed with textures (i.e., a specific concavo-convex structure) for facilitating de-airing. However, the inventors found that when the Vv value of the surface of the polymer film is too low, the laminated glass subjected to hot-pressing process will have bubble defects. On the other hand, when the Vv value of the surface of the polymer film is too high, the polymer film and glass sheets cannot be completely adhered to each other, resulting in edge-delamination defects. Furthermore, textures cannot be completely flattened to remove the air completely, which also results in bubble defects. Given the above, in order to manufacture laminated glass without bubble defects and edge-delamination defects, the first surface of the polymer film of the present invention has a Vv value at a material ratio of 10% ranging from 3 $\mu m^3/\mu m^2$ to 30 $\mu m^3/\mu m^2$. For example, the Vv value of the first surface of the polymer film of the present invention at a material ratio of 10% can be 3 $\mu m^3/\mu m^2$, 3.5 $\mu m^3/\mu m^2$, 4 $\mu m^3/\mu m^2$, 4.5 $\mu m^3/\mu m^2$, 5 $\mu m^3/\mu m^2$, 5.5 $\mu m^3/\mu m^2$, 6 $\mu m^3/\mu m^2$, 6.5 $\mu m^3/\mu m^2$, 7 $\mu m^3/\mu m^2$, 7.5 $\mu m^3/\mu m^2$, 8 $\mu m^3/\mu m^2$, 8.5 $\mu m^3/\mu m^2$, 9 $\mu m^3/\mu m^2$, 9.5 $\mu m^3/\mu m^2$, 10 $\mu m^3/\mu m^2$, 10.5 $\mu m^3/\mu m^2$, 11 $\mu m^3/\mu m^2$, 11.5 $\mu m^3/\mu m^2$, 12 $\mu m^3/\mu m^2$, 12.5 $\mu m^3/\mu m^2$, 13 $\mu m^3/\mu m^2$, 13.5 $\mu m^3/\mu m^2$, 14 $\mu m^3/\mu m^2$, 14.5 $\mu m^3/\mu m^2$, 15 $\mu m^3/\mu m^2$, 15.5 $\mu m^3/\mu m^2$, 16 $\mu m^3/\mu m^2$, 16.5 $\mu m^3/\mu m^2$, 17 $\mu m^3/\mu m^2$, 17.5 $\mu m^3/\mu m^2$, 18 $\mu m^3/\mu m^2$, 18.5 $\mu m^3/\mu m^2$, 19 $\mu m^3/\mu m^2$, 19.5 $\mu m^3/\mu m^2$, 20 $\mu m^3/\mu m^2$, 20.5 $\mu m^3/\mu m^2$, 21 $\mu m^3/\mu m^2$, 21.5 $\mu m^3/\mu m^2$, 22 $\mu m^3/\mu m^2$, 22.5 $\mu m^3/\mu m^2$, 23 $\mu m^3/\mu m^2$, 23.5 $\mu m^3/\mu m^2$, 24 $\mu m^3/\mu m^2$, 24.5 $\mu m^3/\mu m^2$, 25 $\mu m^3/\mu m^2$, 25.5 $\mu m^3/\mu m^2$, 26 $\mu m^3/\mu m^2$, 26.5 $\mu m^3/\mu m^2$, 27 $\mu m^3/\mu m^2$, 27.5 $\mu m^3/\mu m^2$, 28 $\mu m^3/\mu m^2$, 28.5 $\mu m^3/\mu m^2$, 29 $\mu m^3/\mu m^2$, 29.5 $\mu m^3/\mu m^2$, or 30 $\mu m^3/\mu m^2$, or within a range between any two of the values described herein.

The inventors also found that the Vvv value and the ratio of the Sv value to the thickness of the first layer can be controlled to avoid transfer-printing the textures that should only be formed on the first surface onto the surface of the intermediate layer (i.e., the third layer) of the polymer film during machine embossing. The aforementioned transfer-printing results in visible fine lines in the laminated glass, thereby causing visual defects of optical distortion and affecting the visibility of the laminated glass. Thus, the Vvv value of the first surface of the polymer film of the present invention at a material ratio of 80% is less than 2 $\mu m^3/\mu m^2$, such as 1.95 $\mu m^3/\mu m^2$, 1.9 $\mu m^3/\mu m^2$, 1.85 $\mu m^3/\mu m^2$, 1.8 $\mu m^3/\mu m^2$, 1.75 $\mu m^3/\mu m^2$, 1.7 $\mu m^3/\mu m^2$, 1.65 $\mu m^3/\mu m^2$, 1.6 $\mu m^3/\mu m^2$, 1.55 $\mu m^3/\mu m^2$, 1.5 $\mu m^3/\mu m^2$, 1.45 $\mu m^3/\mu m^2$, 1.4 $\mu m^3/\mu m^2$, 1.35 $\mu m^3/\mu m^2$, 1.3 $\mu m^3/\mu m^2$, 1.25 $\mu m^3/\mu m^2$, 1.2 $\mu m^3/\mu m^2$, 1.15 $\mu m^3/\mu m^2$, 1.1 $\mu m^3/\mu m^2$, 1.05 $\mu m^3/\mu m^2$, 1.0 $\mu m^3/\mu m^2$, 0.95 $\mu m^3/\mu m^2$, 0.9 $\mu m^3/\mu m^2$, 0.85 $\mu m^3/\mu m^2$, 0.8 $\mu m^3/\mu m^2$, 0.75 $\mu m^3/\mu m^2$, 0.7 $\mu m^3/\mu m^2$, 0.65 $\mu m^3/\mu m^2$, 0.6

$\mu m^3/\mu m^2$, 0.55 $\mu m^3/\mu m^2$, 0.5 $\mu m^3/\mu m^2$, 0.45 $\mu m^3/\mu m^2$, 0.4 $\mu m^3/\mu m^2$, 0.35 $\mu m^3/\mu m^2$, 0.3 $\mu m^3/\mu m^2$, 0.25 $\mu m^3/\mu m^2$, 0.2 $\mu m^3/\mu m^2$, 0.15 $\mu m^3/\mu m^2$, 0.1 $\mu m^3/\mu m^2$, or 0.05 $\mu m^3/\mu m^2$, or within a range between any two of the values described herein. The ratio of a Sv value of the first surface of the polymer film of the present invention to the thickness of the first layer of the polymer film of the present invention is 0.2 or less, such as 0.2, 0.19, 0.18, 0.17, 0.16, 0.15, 0.14, 0.13, 0.12, 0.11, 0.1, 0.09, 0.08, 0.07, 0.06, 0.05, 0.04, 0.03, 0.02, or 0.01, or within a range between any two of the values described herein. In some embodiments of the present invention, the Vvv value of the first surface of the polymer film of the present invention at a material ratio of 80% is 0.2 $\mu m^3/\mu m^2$ to 1.9 $\mu m^3/\mu m^2$, and the ratio of a Sv value of the first surface of the polymer film of the present invention to the thickness of the first layer of the polymer film of the present invention is 0.05 to 0.18. In some embodiments of the present invention, the Vvv value of the first surface of the polymer film of the present invention at a material ratio of 80% is 0.5 $\mu m^3/\mu m^2$ to 1.9 $\mu m^3/\mu m^2$, and the ratio of a Sv value of the first surface of the polymer film of the present invention to the thickness of the first layer of the polymer film of the present invention is 0.07 to 0.18.

In the polymer film of the present invention, the Sv value of the first surface of the polymer can be adjusted depending on needs, as long as the ratio of the Sv value to the thickness of the first layer is within the designated range. In some embodiments of the present invention, the first surface of the polymer film has a Sv value of 70 µm or less. In some embodiments of the present invention, the first surface of the polymer film has a Sv value ranging from 10 µm to 70 µm.

In the preferred embodiments of the present invention, the second surface of the polymer film also has the aforementioned void volume (Vv) relevant properties of the first surface, including that the second surface has a void volume (Vv) value at a material ratio of 10% ranging from 3 $\mu m^3/\mu m^2$ to 30 $\mu m^3/\mu m^2$ and a dale void volume (Vvv) at a material ratio of 80% less than 2 $\mu m^3/\mu m^2$, and the ratio of the maximum pit height (Sv) of the second surface to the thickness of the second layer is 0.2 or less. The specific value illustrations regarding the above properties of the second surface can refer to the related descriptions for the first surface.

1.2.2. Thickness

As long as the requirements regarding Vv value, Vvv value, and the ratio of the Sv value to the thickness of the first layer are met, the total thickness of the polymer film of the present invention as well as the thickness of each of the first layer, the second layer, and the third layer of the polymer film of the present invention can be adjusted depending on the needs.

In general, the total thickness of the polymer film of the present invention can be 0.1 mm to 2.5 mm, such as 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, 1.05 mm, 1.1 mm, 1.15 mm, 1.2 mm, 1.25 mm, 1.3 mm, 1.35 mm, 1.4 mm, 1.45 mm, 1.5 mm, 1.55 mm, 1.6 mm, 1.65 mm, 1.7 mm, 1.75 mm, 1.8 mm, 1.85 mm, 1.9 mm, 1.95 mm, 2.0 mm, 2.05 mm, 2.1 mm, 2.15 mm, 2.2 mm, 2.25 mm, 2.3 mm, 2.35 mm, 2.4 mm, 2.45 mm, or 2.5 mm, or within a range between any two of the values described herein. In some embodiments of the present invention, the total thickness of the polymer film is 0.5 mm to 1.5 mm.

The thickness of the first layer and the second layer can be independently 250 µm to 450 µm, such as 250 µm, 255 µm, 260 µm, 265 µm, 270 µm, 275 µm, 280 µm, 285 µm, 290 µm, 295 µm, 300 µm, 305 µm, 310 µm, 315 µm, 320 µm, 325 µm, 330 µm, 335 µm, 340 µm, 345 µm, 350 µm, 355 µm, 360 µm, 365 µm, 370 µm, 375 µm, 380 µm, 385 µm, 390 µm, 395 µm, 400 µm, 405 µm, 410 µm, 415 µm, 420 µm, 425 µm, 430 µm, 435 µm, 440 µm, 445 µm, or 450 µm, or within a range between any two of the values described herein. The thickness of the first layer is preferably identical to the thickness of the second layer. In some embodiments of the present invention, the first layer and the second layer independently have a thickness ranging from 300 µm to 420 µm.

The thickness of the third layer can be 50 µm to 250 µm, such as 50 µm, 55 µm, 60 µm, 65 µm, 70 µm, 75 µm, 80 µm, 85 µm, 90 µm, 95 µm, 100 µm, 105 µm, 110 µm, 115 µm, 120 µm, 125 µm, 130 µm, 135 µm, 140 µm, 145 µm, 150 µm, 155 µm, 160 µm, 165 µm, 170 µm, 175 µm, 180 µm, 185 µm, 190 µm, 195 µm, 200 µm, 205 µm, 210 µm, 215 µm, 220 µm, 225 µm, 230 µm, 235 µm, 240 µm, 245 µm, or 250 µm, or within a range between any two of the values described herein. The third layer has a thickness ranging from 100 µm to 200 µm.

1.2.3. Glass Transition Temperature (Tg)

In the case that the requirements of designated Vv value, designated Vvv value, and designated ratio of the Sv value to the thickness of the first layer are met, the glass transition temperature (Tg) of the first layer, the second layer, and the third layer can be independently adjusted depending on the needs. In general, when the Tg of the polymer film is high, the polymer film is relatively hard, making it relatively difficult to form textures via machine embossing. On the other hand, when the Tg of the polymer film is low, the polymer film is relatively soft, making the textures formed via machine embossing too deep. In view of this, in some embodiments of the present invention, the Tg of the first layer and the Tg of the second layer independently range from 5° C. to 25° C. For example, the Tg of the first layer and the Tg of the second layer can be independently 5° C., 6° C., 7° C., 8° C., 9° C., 10° C., 10.5° C., 11° C., 11.5° C., 12° C., 12.5° C., 13° C., 13.5° C., 14° C., 14° C., 15° C., 15.5° C., 16° C., 16.5° C., 17° C., 17.5° C., 18° C., 18.5° C., 19° C., 19.5° C., 20° C., 20.5° C., 21° C., 21.5° C., 22° C., 23° C., 24° C., or 25° C., or within a range between any two of the values described herein. The Tg of the third layer ranges from −30° C. to 10° C. For example, the Tg of the third layer can be −30° C., −29° C., −28° C., −27° C., −26° C., −25° C., −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., or 10° C., or within a range between any two of the values described herein.

1.3. Manufacture of Polymer Film

The method for preparing the polymer film of the present invention is not particularly limited. For example, the polymer film of the present invention may be manufactured by mixing and kneading the polyvinyl acetal and optional constituents (e.g., a plasticizer) to obtain a polymer composition, using the polymer composition to provide a polymer film by means of a conventional film forming method, and performing a machine embossing step to provide the desired Vv value, Vvv value and Sv value on the surface of the polymer film. Examples of the conventional method for providing the polymer film include but are not limited to a calendering method, a casting method, an extrusion stretching method, a direct extruding method, and an extrusion blowing method.

In some embodiments of the present invention, the polymer film is manufactured as follows, but the present invention is not limited thereto. A polyvinyl acetal resin and a plasticizer are mixed and kneaded by using a twin-screw extrusion mixer at a temperature ranging from 150° C. to 250° C. and a rotation speed ranging from 100 rpm to 250 rpm for 5 minutes to 30 minutes to obtain a first polymer film composition for manufacturing the first layer and the second layer and a second polymer film composition for manufacturing the third layer, respectively. Next, the first polymer film composition and the second polymer film composition are cooled down to room temperature and then placed in a co-extruder to co-extrude a film to provide the polymer film of the present invention.

Afterward, the polymer film is subjected to preheating and machine embossing to provide the desired Vv value, Vvv value, and Sv value. As used herein, the machine embossing is directed to a process of forming textures on the surface of the prepared polymer film by a roller. The machine embossing methods include but are not limited to an embossing roller method or a calendaring roller method. The embossing roller method is preferred. The texture types provided by the machine embossing are not particularly limited and include rhombus texture, line texture, sawtooth texture, square texture, taper texture, circle texture, sub-circle texture, and irregular texture. The above-mentioned texture types can be used alone or in a combination of two or more.

The conditions for preheating and machine embossing are adaptively adjusted depending on the constitution of the polymer film. In general, the temperature of a preheating roller can range from 40° C. to 90° C., specifically from 45° C. to 85° C. The temperature of an embossing roller can range from 80° C. to 145° C., specifically from 85° C. to 135° C. The torsion of an embossing roller can range from 0.32 N·m to 1.42 N·m, specifically from 0.32 N·m to 1.3 N·m. The pressure of an embossing roller can range from 5 kg/cm² to 50 kg/cm², specifically from 10 kg/cm² to 40 kg/cm². In some embodiments of the present invention, the temperature of a preheating roller is 60° C. to 85° C., the temperature of an embossing roller is 105° C. to 135° C., the torsion of an embossing roller is 0.7 N·m to 1.2 N·m, and the pressure of an embossing roller is 15 kg/cm² to 38 kg/cm².

With respect to the Vv relevant properties of the polymer film, studies have suggested that those properties can be adjusted by controlling the temperature of the preheating roller, the temperature of the embossing roller, the torsion of the embossing roller, and the pressure of the embossing roller. In general, the higher the temperature of the preheating roller, the temperature of the embossing roller, or the pressure of the embossing roller, the higher the Vvc value and the Sv value of the polymer film. The higher the torsion of the embossing roller, the higher the Vvv value of the polymer film.

2. LAMINATED GLASS

The polymer film of the present invention can be used to manufacture laminated glass. Thus, the present invention also provides laminated glass, which comprises a first glass sheet, a second glass sheet, and an intermediate film disposed between the first glass sheet and the second glass sheet, wherein the intermediate film is provided by the aforementioned polymer film.

The first glass sheet and the second glass sheet may be identical to or different from each other. The first glass sheet and the second glass sheet each can be any conventional glass sheet for manufacturing laminated glass. For example, conventional glass sheets for manufacturing laminated glass include but are not limited to a float glass sheet, a tempered glass sheet, a wired glass sheet, or a plain plate-glass sheet, but the present invention is not limited thereto. In the appended examples, float glass sheets are used as the first glass sheet and the second glass sheet.

The laminated glass of the present invention can be manufactured by any laminated glass manufacturing method known in the art. For example, laminated glass can be manufactured as follows. A polymer film is interposed between two glass sheets to obtain a laminated object, the laminated object is placed into an airtight bag, and the air in the airtight bag is evacuated from the airtight bag (vacuum degree: >500 mmHg) at a temperature of 20° C. to 30° C. for at least 10 minutes. Then, the airtight bag with the laminated object contained therein is placed into a heating furnace, wherein the temperature of the heating furnace was slowly increased from 60° C. to 130° C. After at least 30 minutes, the airtight bag is taken out from the heating furnace to complete pre-pressing. Then, the pre-pressed laminated object is placed in an autoclave and hot-pressed under a high pressure and temperature condition for 100 minutes to 150 minutes to obtain laminated glass. Generally, the high pressure and temperature condition refer to a pressure ranging from 10 bar to 15 bar and a temperature ranging from 100° C. to 150° C.

3. EXAMPLE

3.1. Testing Methods

The present invention is further illustrated by the embodiments hereinafter, wherein the testing instruments and methods are as follows.

[Measurement of the Degree of Acetalization of Polyvinyl Acetal]

The degree of acetalization of polyvinyl acetal is measured in accordance with JIS K6728.

[Measurement of the Degree of Acetylation of Polyvinyl Acetal]

The degree of acetylation of polyvinyl acetal is measured in accordance with JIS K6728.

[Measurement of the Hydroxyl Content of Polyvinyl Acetal]

The hydroxyl content of polyvinyl acetal is measured in accordance with JIS K6728.

[Measurement of Glass Transition Temperature (Tg)]

The Tg of the polymer film is measured in a nitrogen atmosphere by using a differential scanning calorimeter (model no.: TA DSC 25, available from TA Instruments). First, 7 mg of the polymer film as a sample is placed on the sample platform of the differential scanning calorimeter, heated to 150° C. with a heating rate of 10° C./min, and held at the temperature for 5 minutes. The sample is then balanced at −50° C. and held at the temperature for 5 minutes. After that, the sample is heated to 100° C. with a heating rate of 10° C./min to obtain a curve graph of temperature to heat flow (X-axis is temperature and Y-axis is heat flow). The temperature corresponding to the glass transition midpoint is recorded as Tg.

[Measurement of Void Volume (Vv), Dale Void Volume (Vvv), and Maximum Pit Height (Sv)]

First, test samples with a size of 3 cm×3 cm are cut from the polymer film. The void volume (Vv) value at a material ratio of 10% of a surface of the polymer film, the dale void volume (Vvv) value at a material ratio of 80%, and the maximum pit height (Sv) are measured by using the test samples and a laser confocal microscope (model no.: LEXT OLS5000-SAF, available from Olympus) at a temperature of 24±3° C. and relative humidity of 63±3% in accordance with ISO 25178-2:2012. The measuring conditions are as follows: the light source has a wavelength of 405 nm, the objective lenses are 100× (MPLAPON-100×LEXT), the optical zoom is 50×, the image area is 1500 μm×1500 the resolution is 1024 pixels×1024 pixels, the operation conditions are set to auto tilt removal, and no filter is used. In the obtained material ratio curve graph, the core void volume (Vvc) value at a material ratio of 10% to 80% and dale void volume (Vvv) value at a material ratio of 80% can be obtained. The void volume (Vv) value is the sum of the core void volume (Vvc) value and the dale void volume (Vvv) value. The unit of Vv value, Vvv value, and Vvc value is $\mu m^3/\mu m^2$. In addition, the Sv value can be directly obtained from the instrument.

[Bubble Test]

A test sample with a size of 30 cm×30 cm is cut from the laminated glass. The test sample is placed vertically in an oven at 120° C. for 2 hours. Then, the test sample is visually observed to check whether bubbles are found, wherein the bubbles are directed to those which are not in contact with external air and between the glass sheet and the polymer film. The laminated glass is divided into an edge region (a region from edge to 15 mm away from the edge) and a central region (a region that is 15 mm away from the edge). The criteria of the bubble test are as follows. If there are no bubbles in the edge region as well as the central region of the test sample, the result of the bubble test is excellent and recorded as "◎" If there are bubble(s) in the edge region of the test sample but no bubbles in the central region of the test sample, the result of the bubble test is good and recorded as "○". If there are bubbles in the edge region as well as the central region of the test sample, the result of the bubble test is poor and recorded as "×".

[Edge-Delamination Test]

A test sample with a size of 30 cm×30 cm is cut from the laminated glass. The test sample is placed vertically in an oven at 50° C. and relative humidity of 95% for fourteen (14) days. Then the test sample is visually observed to check whether edge-delamination is found. The criteria of the edge-delamination test are as follows: if the test sample does not have edge-delamination (i.e., the polymer film is tightly adhered with the glass sheets), the result of the edge-delamination test is passed and recorded as ◎, contrast, if the test sample has edge-delamination (i.e., the polymer film is not tightly adhered with the glass sheets), the result of the edge-delamination test is failed and recorded as "×".

[Evaluation of Optical Distortion]

First, a laminated glass of 30 cm×30 cm as a test sample as well as a projector, a sample holder, and a white screen are prepared. The projector, sample holder, and white screen are placed in a dark room, wherein the sample holder is placed between the projector and the white screen, and the distance between the projector and the sample holder as well as the distance between the sample holder and the white screen are both 1.5 m. The test sample is disposed on the sample holder, and the angle of the test sample is adjusted such that the test sample is 15 degrees tilted toward the projector with respect to the axis vertical to the ground. The light source of the projector is turned on to make the projected light pass through the test sample and project onto the white screen. The white screen is visually observed to check whether there is any notable brightness or darkness distinction. If the laminated glass does not have fine lines, notable brightness or darkness distinction will not be observed, and the result of optical distortion is recorded as "no". If the laminated glass has fine lines, notable brightness or darkness distinction will be observed, and the result of optical distortion is recorded as "yes".

3.2. Manufacture and Properties of Polymer Film

First, 100 parts by weight of poly(vinyl butyral) (PVB, available from Chang Chun Petrochemical Co., Ltd.) and 40 parts by weight of a plasticizer (triethylene glycol bis(2-ethylhexanoate)) were mixed to obtain a mixture. The mixture was kneaded by using a twin-screw extrusion mixer at 200° C. and a rotation speed of 150 rpm for 15 minutes, and then the mixture was cooled to room temperature to obtain a first polymer film composition used for manufacturing the first layer and the second layer. Next, 100 parts by weight of poly(vinyl butyral) (PVB, available from Chang Chun Petrochemical Co., Ltd.) and 60 parts by weight of a plasticizer (triethylene glycol bis(2-ethylhexanoate)) were mixed to obtain a mixture. The mixture was kneaded by using a twin-screw extrusion mixer at 200° C. and a rotation speed of 150 rpm for 15 minutes, and then the mixture was cooled to room temperature to obtain a second polymer film composition used for manufacturing the third layer. The first film polymer composition and the second polymer film composition were placed in a co-extruder to co-extrude a polymer film with a three-layer structure composed of the first layer/third layer/second layer.

The two surfaces of the polymer film were subjected to preheating and machine embossing in accordance with the parameter conditions as recited in Tables 1-1 and 1-2 to obtain the polymer films of Examples 1 to 6 and Comparative Examples 1 to 7. In addition to the parameter conditions as recited in Tables 1-1 and 1-2, the linear velocity of the polymer film passing through the pair of embossing rollers is 12 m/min. The degree of acetalization, degree of acetylation, and content of hydroxyl of the PVB used in the polymer films of Examples 1 to 6 and Comparative Examples 1 to 7 were measured according to the aforementioned testing methods. The results are listed in Tables 2-1 and 2-2. In addition, the thickness, Tg, Vv, Vvv, Vvc and Sv of the polymer films of Examples 1 to 6 and Comparative Examples 1 to 7 were measured according to the aforementioned testing methods. The results are listed in Tables 2-3 and 2-4.

TABLE 1-1

Conditions of machine embossing of the polymer films of Examples 1 to 6

| Parameters Unit | | Temperature of preheating roller ° C. | Temperature of embossing roller ° C. | Torsion of embossing roller Nm | Pressure of embossing roller kg/cm² |
|---|---|---|---|---|---|
| Example | 1 | 63 | 110 | 0.73 | 18 |
| | 2 | 68 | 120 | 1.03 | 28 |
| | 3 | 75 | 120 | 0.76 | 23 |
| | 4 | 72 | 120 | 0.85 | 26 |
| | 5 | 75 | 130 | 1.15 | 35 |
| | 6 | 83 | 130 | 0.96 | 33 |

TABLE 1-2

Conditions of machine embossing of the polymer films of Comparative Examples 1 to 7

| Parameters Unit | | Temperature of preheating roller ° C. | Temperature of embossing roller ° C. | Torsion of embossing roller Nm | Pressure of embossing roller kg/cm² |
|---|---|---|---|---|---|
| Comparative | 1 | 85 | 140 | 1.42 | 45 |
| Example | 2 | 78 | 140 | 1.08 | 50 |
| | 3 | 78 | 120 | 1.34 | 34 |

TABLE 1-2-continued

Conditions of machine embossing of the polymer films of Comparative Examples 1 to 7

| Parameters Unit | Temperature of preheating roller ° C. | Temperature of embossing roller ° C. | Torsion of embossing roller Nm | Pressure of embossing roller kg/cm² |
|---|---|---|---|---|
| 4 | 40 | 80 | 0.32 | 5 |
| 5 | 90 | 145 | 0.85 | 30 |
| 6 | 75 | 130 | 0.86 | 34 |
| 7 | 65 | 120 | 0.75 | 38 |

TABLE 2-1

Properties of PVB of Examples 1 to 6

| | Properties | Unit | Example 1 | 2 | 3 | 4 | 5 | 6 |
|---|---|---|---|---|---|---|---|---|
| First layer and second layer | Degree of acetalization | mol % | 71.36 | 71.47 | 71.75 | 71.98 | 71.67 | 71.18 |
| | Degree of acetylization | mol % | 0.44 | 0.43 | 0.45 | 0.42 | 0.43 | 0.52 |
| | Content of hydroxyl | mol % | 28.2 | 28.1 | 27.8 | 27.6 | 27.9 | 28.3 |
| Third layer | Degree of acetalization | mol % | 67.0 | 71.1 | 70.6 | 67.2 | 62.1 | 57.9 |
| | Degree of acetylization | mol % | 8.2 | 5.6 | 2.2 | 7.2 | 12.5 | 15.8 |
| | Content of hydroxyl | mol % | 24.8 | 23.3 | 27.2 | 25.6 | 25.4 | 26.3 |

TABLE 2-2

Properties of PVB of Comparative Examples 1 to 7

| | Properties | Unit | Comparative Example 1 | 2 | 3 | 4 | 5 | 6 | 7 |
|---|---|---|---|---|---|---|---|---|---|
| First layer and second layer | Degree of acetalization | mol % | 71.05 | 71.68 | 72.15 | 70.70 | 70.98 | 71.21 | 69.20 |
| | Degree of acetylization | mol % | 0.45 | 0.52 | 0.55 | 0.40 | 0.42 | 0.49 | 5.20 |
| | Content of hydroxyl | mol % | 28.5 | 27.8 | 27.3 | 28.9 | 28.6 | 28.3 | 25.6 |
| Third layer | Degree of acetalization | mol % | 73.2 | 67.7 | 64.4 | 59.5 | 70.0 | 72.8 | 55.1 |
| | Degree of acetylization | mol % | 4.3 | 6.2 | 8.3 | 15.1 | 5.2 | 3.5 | 18.3 |
| | Content of hydroxyl | mol % | 22.5 | 26.1 | 27.3 | 25.4 | 24.8 | 23.7 | 26.6 |

TABLE 2-3

Properties of polymer films of Examples 1 to 6

| Properties | Unit | Example 1 | 2 | 3 | 4 | 5 | 6 |
|---|---|---|---|---|---|---|---|
| Tg of first layer and second layer | ° C. | 13.2 | 13.7 | 13.8 | 14.3 | 14.2 | 14.3 |
| Tg of third layer | ° C. | −15.2 | −13.3 | 5.3 | −12.6 | −20.3 | −22.7 |
| Thickness of each of first layer and second layer | μm | 360 | 361 | 387 | 366 | 348 | 402 |

TABLE 2-3-continued

Properties of polymer films of Examples 1 to 6

| Properties | Unit | Example | | | | | |
|---|---|---|---|---|---|---|---|
| | | 1 | 2 | 3 | 4 | 5 | 6 |
| Thickness of third layer | μm | 135 | 125 | 120 | 142 | 138 | 162 |
| Vvv | μm$^3$/μm$^2$ | 0.60 | 1.25 | 0.63 | 0.81 | 1.83 | 1.11 |
| Vvc | μm$^3$/μm$^2$ | 8.96 | 14.80 | 18.70 | 17.64 | 22.52 | 26.32 |
| Vv | μm$^3$/μm$^2$ | 9.56 | 16.05 | 19.33 | 18.45 | 24.35 | 27.43 |
| Sv | μm | 27.31 | 49.70 | 36.63 | 45.60 | 59.82 | 51.65 |
| Sv/thickness of first layer | | 0.08 | 0.14 | 0.09 | 0.12 | 0.17 | 0.13 |

TABLE 2-4

Properties of polymer films of Comparative Examples 1 to 7

| Properties | Unit | Comparative Example | | | | | | |
|---|---|---|---|---|---|---|---|---|
| | | 1 | 2 | 3 | 4 | 5 | 6 | 7 |
| Tg of first layer and second layer | °C. | 14.6 | 13.3 | 13.1 | 15.3 | 14.5 | 14.4 | −9.3 |
| Tg of third layer | °C. | −14.6 | −11.7 | −13.5 | −25.6 | −15.3 | −10.3 | −28.7 |
| Thickness of each of first layer and second layer | μm | 349 | 358 | 356 | 362 | 325 | 285 | 375 |
| Thickness of third layer | μm | 136 | 135 | 131 | 135 | 139 | 132 | 125 |
| Vvv | μm$^3$/μm$^2$ | 2.81 | 1.52 | 2.32 | 0.18 | 0.79 | 0.83 | 4.62 |
| Vvc | μm$^3$/μm$^2$ | 33.64 | 32.25 | 19.24 | 2.15 | 52.66 | 23.32 | 70.51 |
| Vv | μm$^3$/μm$^2$ | 36.45 | 33.77 | 21.56 | 2.33 | 53.45 | 24.15 | 75.13 |
| Sv | μm | 88.43 | 94.71 | 55.25 | 8.25 | 59.25 | 60.12 | 105.30 |
| Sv/thickness of first layer | | 0.25 | 0.26 | 0.16 | 0.02 | 0.18 | 0.21 | 0.28 |

3.3. Manufacture and Properties of Laminated Glass

Laminated glass was manufactured respectively by using the polymer films of Examples 1 to 6 and Comparative Examples 1 to 7. First, two clean and transparent float glass sheets (length: 300 mm; width: 300 mm; thickness: 2 mm to 2.2 mm) were provided. The polymer films of Examples 1 to 6 and Comparative Examples 1 to 7 were interposed respectively between the two transparent float glass sheets to obtain a laminated object. The laminated object was pre-pressed by means of evacuation using an airtight bag. The pre-pressing was performed as follows. The laminated object was placed into an airtight bag, and the air was evacuated from the airtight bag (vacuum degree: >500 mmHg) at a temperature of 20° C. to 30° C. for at least 10 minutes. Next, the airtight bag with the laminated object contained therein was placed into a heating furnace, kept at a temperature of 20° C. to 30° C. for 10 minutes to 20 minutes, then heated to 60° C. to 130° C. and kept for 15 minutes to 45 minutes. Afterward, the airtight bag was taken out from the heating furnace and allowed to cool to room temperature. Then, the pre-pressed laminated object was taken out from the airtight bag, placed in an autoclave, subjected to hot-pressing at a pressure of 13 bar and a temperature of 135° C. for 120 minutes, and then cooled to room temperature to obtain the laminated glass.

The properties of the laminated glass of Examples 1 to 6 and Comparative Examples 1 to 7, including evaluation of optical distortion, bubble test, and edge-delamination test were evaluated according to the aforementioned testing methods, and the results are listed in Table 3.

TABLE 3

Properties of laminated glass of each of Examples 1 to 6 and Comparative Examples 1 to 7

| | | Optical distortion | Bubble test | Edge-delamination |
|---|---|---|---|---|
| Example | 1 | No | | |
| | 2 | No | | |
| | 3 | No | | |
| | 4 | No | | |
| | 5 | No | | |
| | 6 | No | ○ | |
| Comparative Example | 1 | Yes | ○ | x |
| | 2 | Yes | ○ | x |
| | 3 | Yes | | |
| | 4 | No | x | |
| | 5 | No | x | x |
| | 6 | Yes | | |
| | 7 | Yes | x | x |

As shown in Table 3, the laminated glass manufactured from the polymer film of the present invention achieved satisfactory results regarding the evaluation of optical distortion, bubble test, and edge-delamination test. Particularly, Examples 1 to 6 show that, only when the Vv value and Vvv value of the first surface of the polymer film, as well as the ratio of Sv value of the first surface to the thickness of the first layer of the polymer film, are all within the designated ranges, the manufactured laminated glass can be simultaneously free of bubbles, optical distortion and edge-delamination.

By contrast, as shown in Table 3, the laminated glass manufactured from the polymer film that is not according to the present invention cannot simultaneously has the advantages of having no optical distortion, bubbles, and edge-delamination. Specifically, Comparative Examples 1 and 7 show that, when the Vv value and Vvv value of the first surface of the polymer film as well as the ratio of Sv value of the first surface to the thickness of the first layer of the polymer film are not within the designated ranges, the manufactured laminated glasses have optical distortion, bubbles, and edge-delamination defects. Comparative Example 2 shows that, when the ratio of the Sv value of the first surface of the polymer film to the thickness of the first layer of the polymer film as well as the Vv value are not within the designated ranges, even the Vvv value is within the designated range, the manufactured laminated glass has optical distortion and edge-delamination defects. Comparative Example 3 shows that, when the Vvv value of the first surface of the polymer film is not within the designated range, even the Vv value and the ratio of the Sv value to the thickness of the first layer are within the designated ranges, the manufactured laminated glass has optical distortion defects. Comparative Examples 4 and 5 show that, when the Vv value of the first surface of the polymer film is not within the designated range, even the Vvv value and the ratio of the Sv value to the thickness of the first layer are within the designated ranges, the manufactured laminated glasses have the defect of bubbles and may further have the defect of edge-delamination. Comparative Example 6 shows that, when the ratio of the Sv value of the first surface of the polymer film to the thickness of the first layer of the polymer film is not within the designated range, even the Vv value and the Vvv value of the first surface of the polymer film are within the designated ranges, the manufactured laminated glass has optical distortion defect.

The above examples are used to illustrate the principle and efficacy of the present invention and show the inventive features thereof but are not used to limit the scope of the present invention. People skilled in this field may proceed with a variety of modifications and replacements based on the disclosures and suggestions of the invention as described. Therefore, the scope of protection of the present invention is that as defined in the claims as appended.

What is claimed is:

1. A polymer film, which comprises a first layer, a second layer and a third layer disposed between the first layer and the second layer, wherein the two surfaces of the third layer are in contact with the first layer and the second layer, respectively, the surface of the first layer that is not in contact with the third layer is a first surface, and the surface of the second layer that is not in contact with the third layer is a second surface, wherein the first surface has a void volume (Vv) value at a material ratio of 10% ranging from 4 $\mu m^3/\mu m^2$ to 29 $\mu m^3/\mu m^2$ and a dale void volume (Vvv) at a material ratio of 80% ranging from 0.2 $\mu m^3/\mu m^2$ to 1.9 $\mu m^3/\mu m^2$, and the ratio of the maximum pit height (Sv) of the first surface to the thickness of the first layer is 0.07 to 0.18, wherein the first layer, the second layer and the third layer independently comprise poly(vinyl butyral) and a plasticizer, wherein the amount of the plasticizer comprised in the first layer ranges from 30 parts by weight to 60 parts by weight based on 100 parts by weight of the poly(vinyl butyral) comprised in the first layer, the amount of the plasticizer comprised in the second layer ranges from 30 parts by weight to 60 parts by weight based on 100 parts by weight of the poly(vinyl butyral) comprised in the second layer, and the amount of the plasticizer comprised in the third layer ranges from 50 parts by weight to 80 parts by weight based on 100 parts by weight of poly(vinyl butyral) comprised in the third layer, and wherein the first layer and the second layer independently have a glass transition temperature (Tg) ranging from 10° C. to 20° C.

2. The polymer film of claim 1, wherein the second surface has a void volume (Vv) value at a material ratio of 10% ranging from 4 $\mu m^3/\mu m^2$ to 29 $\mu m^3/\mu m^2$ and a dale void volume (Vvv) at a material ratio of 80% ranging from 0.2 $\mu m^3/\mu m^2$ to 1.9 $\mu m^3/\mu m^2$, and the ratio of the maximum pit height (Sv) of the second surface to the thickness of the second layer is 0.07 to 0.18.

3. The polymer film of claim 1, wherein the first layer and the second layer independently have a thickness ranging from 250 μm to 450 μm.

4. The polymer film of claim 1, wherein the thickness of the first layer is identical to the thickness of the second layer.

5. The polymer film of claim 1, wherein the third layer has a thickness ranging from 50 μm to 250 μm.

6. The polymer film of claim 1, wherein the third layer has a glass transition temperature (Tg) ranging from −30° C. to 10° C., and wherein the poly(vinyl butyral) comprised in the third layer has a degree of acetalization ranging from 52 mol % to 80 mol %, a degree of acetylation ranging from 0.1 mol % to 20 mol %, and content of hydroxyl ranging from 20 mol % to 28 mol %.

7. The polymer film of claim 2, wherein the third layer has a glass transition temperature (Tg) ranging from −30° C. to 10° C., and wherein the poly(vinyl butyral) comprised in the third layer has a degree of acetalization ranging from 52 mol % to 80 mol %, a degree of acetylation ranging from 0.1 mol % to 20 mol %, and content of hydroxyl ranging from 20 mol % to 28 mol %.

8. The polymer film of claim 3, wherein the third layer has a glass transition temperature (Tg) ranging from −30° ° C. to 10° C., and wherein the poly(vinyl butyral) comprised in the third layer has a degree of acetalization ranging from 52 mol % to 80 mol %, a degree of acetylation ranging from 0.1 mol % to 20 mol %, and content of hydroxyl ranging from 20 mol % to 28 mol %.

9. The polymer film of claim 1, wherein the polymer film has a thickness ranging from 0.1 mm to 2.5 mm.

10. The polymer film of claim 2, wherein the polymer film has a thickness ranging from 0.1 mm to 2.5 mm.

11. The polymer film of claim 3, wherein the polymer film has a thickness ranging from 0.1 mm to 2.5 mm.

12. A laminated glass, which comprises a first glass sheet, a second glass sheet, and an intermediate film disposed between the first glass sheet and the second glass sheet, wherein the intermediate film is provided by the polymer film of claim 1.

13. A laminated glass, which comprises a first glass sheet, a second glass sheet, and an intermediate film disposed between the first glass sheet and the second glass sheet, wherein the intermediate film is provided by the polymer film of claim 2.

14. A laminated glass, which comprises a first glass sheet, a second glass sheet, and an intermediate film disposed between the first glass sheet and the second glass sheet, wherein the intermediate film is provided by the polymer film of claim 3.

\* \* \* \* \*